United States Patent [19]

Zachmeier et al.

[11] 4,208,120

[45] Jun. 17, 1980

[54] APPARATUS FOR WINDING PORTIONS OF FILMS ONTO TAKEUP REELS WHICH ARE CONFINED IN CASSETTES OR THE LIKE

[75] Inventors: Alois Zachmeier; Horst Wildner; Heinz Kölbl, all of Munich, Fed. Rep. of Germany

[73] Assignee: Agfa-Gevaert Aktiengesellschaft, Leverkusen, Fed. Rep. of Germany

[21] Appl. No.: 845,885

[22] Filed: Oct. 27, 1977

[30] Foreign Application Priority Data

Oct. 29, 1976 [DE] Fed. Rep. of Germany ....... 2649675

[51] Int. Cl.$^{2}$ ........................................ G03B 1/18

[52] U.S. Cl. ........................ 354/354; 242/71.2; 242/71.5; 354/173

[58] Field of Search ............ 354/173, 202, 212, 213, 354/214, 277, 307, 310, 311, 312, 313, 314, 354, 21; 242/71.2, 71.4, 71.5; 226/91; 352/75, 78

[56] References Cited

U.S. PATENT DOCUMENTS

| | | | |
|---|---|---|---|
| 2,764,364 | 9/1956 | Ashley | 242/71.2 |
| 3,247,773 | 4/1966 | Doblin et al. | 354/213 |
| 3,388,648 | 6/1968 | Thiele et al. | 354/21 |
| 3,481,261 | 12/1969 | Fischer et al. | 354/173 |
| 3,603,232 | 9/1971 | Jones | 354/212 |
| 3,650,489 | 3/1972 | Bresson et al. | 242/71.4 |
| 3,782,259 | 1/1974 | Noble | 354/202 |
| 3,807,841 | 4/1974 | Dudley et al. | 352/75 |
| 3,882,515 | 5/1975 | Mueller | 354/173 |
| 3,921,878 | 11/1975 | Zangenfeind | 226/91 |
| 4,076,135 | 2/1978 | Klose | 354/312 |
| 4,077,041 | 2/1978 | Imura | 354/21 |

*Primary Examiner*—L. T. Hix
*Assistant Examiner*—Alan Mathews
*Attorney, Agent, or Firm*—Peter K. Kontler

[57] ABSTRACT

Apparatus for winding the remaining unexposed frames of partly exposed films onto takeup reels in film cassettes has a socket for reception of a portion of a cassette and one or more sealing strips or cushions which prevent entry of light through the exposure window of the cassette. The gear of the takeup reel is automatically engaged by a driving gear which completes the winding of film onto the takeup reel with a force which cannot overcome the resistance of connection between the trailing end of the film and the cassette. The driving gear receives torque from a motor which is started by a microswitch in response to proper insertion of a cassette into the socket.

15 Claims, 3 Drawing Figures

APPARATUS FOR WINDING PORTIONS OF FILMS ONTO TAKEUP REELS WHICH ARE CONFINED IN CASSETTES OR THE LIKE

BACKGROUND OF THE INVENTION

The present invention relates to apparatus for transporting flexible webs, especially photographic films, in containers. More particularly, the invention relates to improvements in apparatus for completing the transport of flexible webs in a direction toward and for convoluting the webs on rotary takeup devices whose web-collecting portions are confined in containers.

The processing of exposed photographic customer films in laboratories involves the removal of films from their containers and splicing of successive films end-to-end to form a long web which is thereupon transported through a developing and printing machine. Modern processing laboratories are equipped with devices which automatically remove exposed films from their containers and advance the removed films to a splicing station. The afore-mentioned web is convoluted onto a large reel which is thereupon transferred into the developing machine. Automatic removal of films from their containers (e.g., commercially available cassettes for roll films having 20 or 36 frames) necessitates winding of the entire film onto the takeup reel or spool in the container. Thus, if a customer sends in or delivers a container wherein one or more frames at the trailing end of the film remained unexposed, an attendant must rotate the takeup reel so as to insure that all frames of the film are convoluted on the core of the takeup reel before the container is introduced into the automatic film removing device. As a rule, containers for customer films are provided with hooks or analogous intercepting members which engage the trailing ends of films to prevent detachment of the trailing ends from the containers. The attendant notes the increasing resistance to rotation of the takeup reel when the hook engages the trailing end of the film and is thus apprised of the fact that the winding of film is completed. The hook and the material of the film offer a certain resistance to further rotation of the takeup reel in a direction to collect the film so that the engagement of trailing end with the hook is readily detectable. When the hook engages the trailing end (e.g., when the hook enters a perforation in the trailing end), a portion of the film in front of the trailing end extends across the customary exposure window which is provided in the casing of the container to admit light to successive film frames while the container is located in the chamber of a photographic apparatus, such as a still camera. That portion of the film which registers with the exposure window is then in an optimum position for expulsion of the trailing end of the film from the container and into the range of advancing rolls which move the trailing end (which is now the leader) of the film toward the splicing station. Reference may be had to commonly owned U.S. Pat. No. 3,921,878 granted Nov. 25, 1975 to Zangenfeind which discloses a suitable device for expulsion of photographic films from cassettes or analogous containers.

When the attendant detects that the film in a cassette is not fully convoluted onto the takeup reel, the latter is rotated by hand until the attendant notes that the film is taut, i.e., that the hook has entered the notch in the trailing end of the film. In accordance with presently prevailing practice, the attendant places the gear of the takeup reel into contact with a rack and moves the rack relative to the cassette to thereby wind the remaining unexposed frames of the film onto the takeup reel. It is also known to employ a simple crank which is inserted into the hole of the takeup reel and is rotated by hand. The just described procedures are acceptable for small-scale film development and further processing. However, the winding of a large number of films in a modern processing laboratory takes up too much time and is a tedious task requiring a substantial physical effort.

Another serious drawback of the just described conventional procedure is that the remaining frames of the film (i.e., those frames which must be convoluted onto the takeup reel) are exposed to light because successive increments of such frames must be transported past the exposure window on their way toward the core of the takeup reel. Therefore, such frames cannot be exposed during processing of the films for the purpose of exposing indicia (e.g., digits and/or characters) which are detected by certain components of the copying machine for the making of reproductions of some or all exposed and developed film frames. The indicia are also useful in assembling the exposed and developed films with corresponding prints prior to insertion of films and prints into envelopes or boxes preparatory to shipment to dealers or directly to customers.

OBJECTS AND SUMMARY OF THE INVENTION

An object of the invention is to provide a simple, compact and relatively inexpensive apparatus which can complete the winding of exposed or partly exposed photographic films onto takeup reels with a minimum of effort, with little loss in time and without tearing or otherwise damaging the films.

Another object of the invention is to provide an apparatus of the just outlined character which is constructed and assembled in such a way that a container for flexible webs, such as exposed or partly exposed photographic films, can be properly oriented relative thereto even if the attendant does not focus his or her attention upon the apparatus and/or the container.

A further object of the invention is to provide an apparatus which occupies little room, which can be readily installed in close proximity to the location where the containers are further processed, and whose energy requirements are surprisingly low.

An additional object of the invention is to provide an apparatus which need not be manipulated at all, i.e., which is always ready to transport and convolute a photographic film or other flexible web material as soon as the container for the web is properly positioned with respect to the apparatus so that an attendant can hold the container with one hand while the other hand performs another operation.

An ancillary object of the invention is to provide a novel and improved apparatus for completing the winding of partially exposed photographic films onto the takeup reels or spools of cassettes for use in still cameras or motion picture cameras.

Another object of the invention is to provide an apparatus which prevents exposure of unexposed film frames to light in the course of winding of such frames onto the takeup reel of a cassette.

One feature of the invention resides in the provision of an apparatus for winding flexible webs onto rotary takeup devices whose web-receiving portions are installed in the interior of containers of the type wherein successive increments of the web advance past at least one light-admitting opening on their way toward the takeup device and the opening is disposed at a predetermined distance from the takeup device, particularly in cassettes for photographic films wherein successive increments of film advance past a normally polygonal (square or rectangular) exposure window on their way toward the takeup reel. The apparatus comprises supporting means (e.g., a discrete housing or a portion of the casing or frame of an apparatus wherein exposed photographic films are automatically withdrawn from their cassettes), a gear or an analogous rotary driving element which is mounted in the supporting means and can be rotated by a prime mover (e.g., an electric motor or a transmission which is interposed between the output element of the electric motor and the driving element), and sealing means mounted in the supporting means at the aforementioned predetermined distance from the driving element to prevent entry of light into the opening of a container whose takeup device is placed into engagement with and is rotated by the driving element in a direction to advance the web toward and to convolute the web on the takeup device.

Containers of the type adapted to be treated in the apparatus of the present invention normally comprise takeup devices in the form of reels or spools which include gears or the like disposed externally of the respective containers. Such gears of the takeup reels are placed into mesh with the driving element when the openings of the respective containers are shielded from light by the sealing means.

The sealing means may comprise a polygonal cushion which is made of an elastomeric material and is deformed by a portion of a container (e.g., by two parallel cheeks which flank the light-admitting opening) when the container is properly oriented with respect to the supporting means. Alternatively, the sealing means may comprise several deformable strips which are engaged by the cheeks of the containers.

The supporting means may comprise a socket whose outline is complementary to the configuration of a container so that the container can be inserted into the socket in a single position with respect to the supporting means, i.e., in such orientation in which the takeup device is engaged by and can receive torque from the driving element while the sealing means shields the opening against entry of light.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
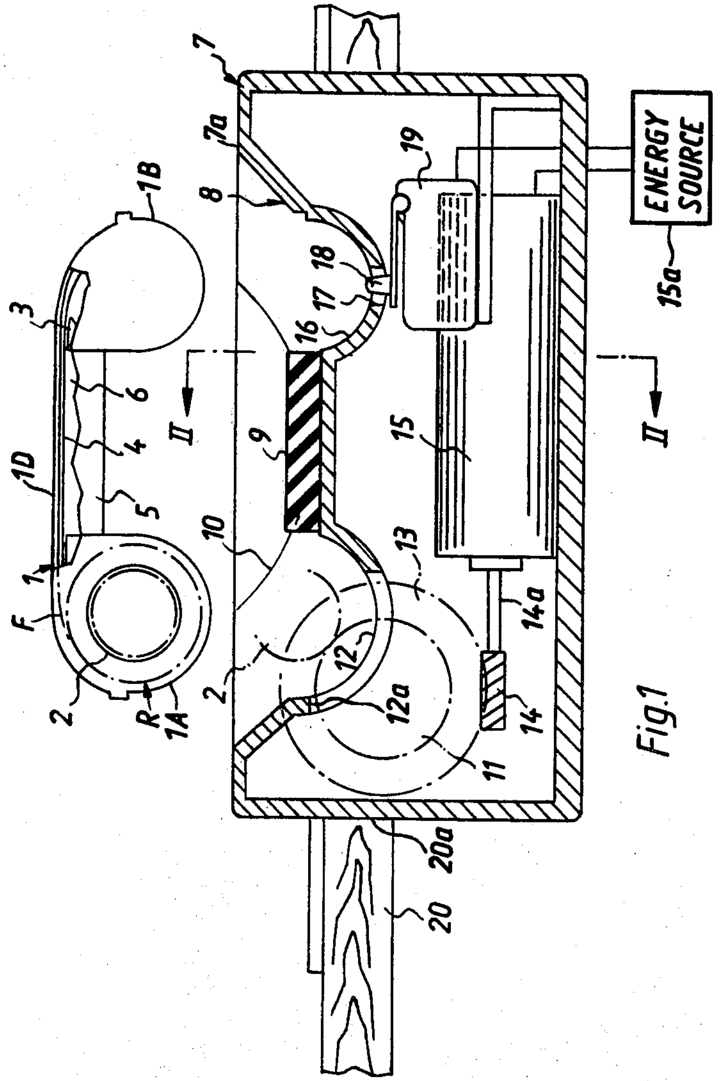
FIG. 1 is a longitudinal vertical sectional view of an apparatus which embodies one form of the invention, a cassette for photographic film being shown at a level above the socket of the supporting means.
Figure 2:
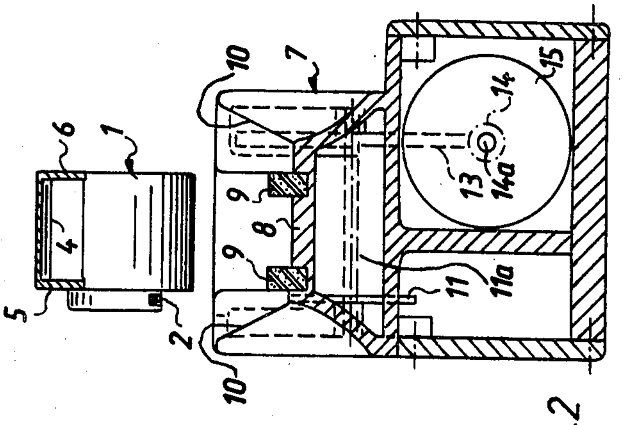
FIG. 2 is a transverse vertical sectional view as seen in the direction of arrows from the line II—II of FIG. 1.

Referring first to FIGS. 1 and 2, there is shown an apparatus which can complete the winding of photographic film F onto the takeup reel R in a container 1 here shown as a drop-in cassette for use in still cameras. The illustrated cassette 1 is of the type known as "110" and comprises a substantially cylindrical first section 1A, a substantially cylindrical second section 1B and a flat elongated central section or bridge 1D having an exposure window 4 disposed between two parallel flanges or cheeks 5, 6 and serving to admit scene light to successive frames of the film F when the cassette 1 is properly installed in the chamber of a still camera, not shown. The section 1A contains the major portion of the takeup reel R, and the latter further comprises a toothed portion or gear 2 which is located outside of the section 1A and can be rotated by the film transporting mechanism of the camera, always by the length of a film frame, so as to place successive unexposed film frames into register with the window 4. The section 1B contains a customary supply reel for unexposed roll film and a hook-shaped intercepting member 3 which is located ahead of the window 4 (as considered in the direction of transport of film frames toward the reel R) and is positioned in such a way that it automatically enters a notch in the trailing end of the film F when the last frame of such film has been moved beyond the window 4. The trailing end of the film and the intercepting member 3 then oppose the forward movement of film F with a predetermined force, i.e., the completion of exposure of last film frame is readily detectable by a photographer who attempts to actuate the film transporting mechanism when the intercepting member 3 already engages the trailing end.

The window 4 is normally located opposite a smaller window (not shown) which permits a pusher or an analogous device to expel the trailing end of the film through the window 4 and into the range of advancing rolls serving to transport the trailing end (which is then the leader of the film F) toward the splicing station. Reference may be had to the aforementioned commonly owned U.S. Pat. No. 3,921,878 to Zangenfeind.

The improved apparatus comprises supporting means here shown as a relatively small and lightweight housing 7 having a top wall 7*a* which is formed with a socket 8 having an outline complementary to that of the underside of the cassette 1, as viewed in FIG. 1. Thus, the socket 8 has a relatively shallow central portion for the section 1D and two deeper portions 12, 16 which respectively receive the rounded parts of the sections 1A and 1B when the cassette 1 is properly oriented with respect to the supporting means. The outlines of the portions 12 and 16 are sufficiently different to insure that the section 1B cannot enter the portion 12 and/or that the section 1A cannot enter the portion 16. In other words, an attendant who grasps the cassette 1 with one hand need not even look at the socket 8; such attendant knows that the cassette 1 will fit into the socket in the position in which it is held when an insertion is attempted or in a position which the cassette assumes after turning through 180 degrees.

The housing 7 supports means for sealing the window 4 against entry of light during winding of the remaining film frames onto the takeup reel R. The sealing means includes two elongated elastic strips 9 which are glued or otherwise bonded to the wall 7*a* in such positions that they are engaged by the cheeks 5 and 6 when a cassette 1 is properly inserted into the socket 8. The sealing strips 9 are sufficiently long to engage the outer sides of the sections 1A and 1B in the portions 12, 16 of the socket 8 while simultaneously engaging with the respective cheeks to thus prevent entry of any light into the section 1D by way of the window 4. The aforementioned opening opposite the window 4 cannot admit light against unexposed film frames because the cassette 1 contains a backing strip (not shown) which overlies the rear side of the film F. The backing strip normally carries numerals which register with the opening opposite the window 4 and are observable from the exterior of a camera so that the user of the camera can ascertain the number of exposed or unexposed film frames in the cassette 1. Such numerals are of assistance to the attendant who is in charge of completing the winding of film F onto the takeup reel R, i.e., the attendant looks at the opening opposite the window and immediately notes whether or not one or more unexposed film frames are still located in the section 1B.

The wall *7a* of the housing 7 is preferably further provided with lateral recesses 10 which communicate with the central portion of the socket 8 and enable the attendant to insert his or her fingers while the hand grips the cassette 1 and maintains the cheeks 5, 6 as well as the sections 1A, 1B in sealing engagement with the strips 9. The distance between the strips 9 (see FIG. 2) equals or is slightly less than the distance between the cheeks 5, 6 to make sure that the cheeks invariably engage and deform the respective strips when a cassette 1 is properly inserted into the socket 8.

The housing 7 further supports a rotary driving element 11, here shown as a metallic gear, which meshes with the gear 2 of the takeup reel R of a properly inserted cassette 1. The shaft *11a* of the gear 11 is parallel to the axis of the takeup reel R in a properly inserted cassette 1 and is rigid with a larger gear 13 forming part of a transmission which drives the gear 11 and hence the gear 2. The transmission further includes a worm wheel 14 which meshes with the gear 13 and whose shaft *14a* is the output element of a prime mover here shown as a small electric motor 15 connected to a source *15a* of electrical energy. The source *15a* may but need not be installed outside of the housing 7. That portion of the wall *7a* which defines the portion 12 of the socket 8 is formed with a slot *12a* through which a portion of the gear 11 extends into mesh with the gear 2 in the portion 12. Thus, the gear 2 automatically enters into mesh with the gear 11 when the section 1A of a cassette 1 is properly inserted into the portion 12 of the recess 8.

In order to save electrical energy, the apparatus may be provided with means for starting the motor 15 in automatic response to full insertion of a cassette 1 into the socket 8. The starting means includes a microswitch 19 which is mounted in the housing 7 below the portion 16 of the socket 8 and is in circuit with the motor 15. A movable portion 18 of the switch 19 extends upwardly through an aperture 17 in the wall portion which defines the portion 16 of the socket 8. Thus, when the section 1B of a cassette 1 enters the portion 16, it depresses the movable portion 18 and thereby actuates the switch 19 which completes the circuit of the motor 15. The output element *14a* rotates the gear 11 by way of the transmission 14, 13 in a direction to move successive increments of film F toward and to convolute such increments onto the core of the reel R in the socket portion 12. The torque which the motor 15 can transmit and the ratio of the transmission are preferably selected in such a way that the gear 11 is automatically arrested when the intercepting member 3 enters the notch or hole in the trailing end of film F in the cassette which is properly inserted into the socket 8, i.e., the motor 15 cannot cause complete separation of the trailing end from the casing of the cassette. This is desirable on the aforediscussed ground, i.e., that the pusher of the device which expels the trailing end of the film from the cassette 1 invariably engages the trailing end when it enters the opening opposite the window 4 and moves toward and through the window in a downward direction, as viewed in FIG. 1.

The operation is as follows:

The attendant detects that the film F in a given cassette 1 includes at least unexposed film frame. The upper portions of the cheeks 5, 6 are then grasped by one hand and the cassette is inserted into the socket 8 so that the sections 1A and 1B respectively enter the portions 12 and 16. By pushing the casing of the cassette 1 downwardly, the attendant insures that the strips 9 are deformed into requisite sealing engagement with the respective cheeks as well as with the outer sides of the sections 1A and 1B.

The motor 15 is started by the switch 19 in automatic response to depression of movable portion 18 by the section 1B in the socket portion 16. The motor 15 drives the gear 11 which drives the gear 2 and causes the reel R to rotate in a direction (anticlockwise, as viewed in FIG. 1) to collect the remaining unexposed frame or frames of the film F. The transport of film is terminated in automatic response to engagement of intercepting member 3 with the trailing end of the film.

Casssettes 1 are removed from envelopes or boxes which are used by customers and/or dealers to ship or deliver customer films to a processing laboratory. Cassettes wherein the films are completely convoluted onto the respective takeup reels (i.e., wherein the intercepting members 3 engage the trailing ends of the films) are inserted into a first inlet of the apparatus wherein the films are expelled from their cassettes. One form of such apparatus is described in the commonly owned copending application Ser. No. 729,773 filed Oct. 5, 1976 by Klaus Klose, now U.S. Pat. No. 4,076,135. The envelope from which the cassette has been removed is inserted into a second inlet of such apparatus so that the information on the envelope can be decoded in order to insure proper processing of the respective film. Such information may include the code number of the customer or dealer, the desired number of prints, the desired size and/or quality of prints and/or others.

Stoppage of the motor 15 in response to engagement of intercepting member 3 with the trailing end of a film 1 in the cassette which is located in the socket 8 is readily discernible by the attendant, i.e., the attendant is apprised of the fact that the winding of film F onto the reel R is completed and that the cassette 1 can be removed from the socket 8. As a rule, the winding of remaining unexposed film frame or frames onto the reel R of a cassette 1 in the socket 8 takes up an interval of $\frac{1}{4}$ to 2 seconds.

The housing 7 can be made of a suitable lightweight synthetic plastic material. It is preferably assembled of two or more sections which are produced by resorting to injection molding or another suitable mass-producing technique. Such sections can be held together by an adhesive, by screws or bolts or by other suitable fastener means. In order to make sure that the housing 7 will not move when the attendant inserts or attempts to insert a cassette 1 into the socket 8, it is desirable to fixedly secure the housing to a stationary part, such as the top panel 20 of apparatus of the type disclosed in the aforementioned copending application Ser. No. 729,773 of Klose. As shown, the housing 7 can be installed in an opening 20*a* of the panel 20.

The embodiment which is shown in FIGS. 1 and 2 constitutes but one of many forms of apparatus which incorporate the features of the present invention. For example, the apparatus can be simplified by omitting the housing 7 and installing the driving element 11 and the drive means therefor directly in the housing which includes the panel 20. The upper side of the panel 20 (supporting means) is then formed with a recess corresponding to the recess 8 of the wall 7*a*. Furthermore, the switch 19 can be omitted so that the motor 15 is on at all times and ceases to rotate gear 11 only when the latter encounters a predetermined resistance indicating that the intercepting member 3 has engaged the trailing end of a film F. Still further, the switch 19 can be installed in the portion 12 of the socket 8 or at another locus where it is actuated by the cassette when the latter is properly oriented with respect to the supporting means. It is also possible to place the switch 19 within reach of one finger on the hand which grips the cassette 1 and maintains the cassette in the socket 8 of the wall 7*a* or in the socket of the panel 20.

Figure 3:
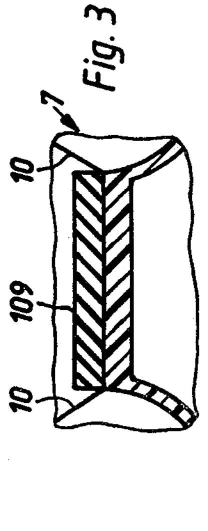
FIG. 3 is a fragmentary transverse vertical sectional view of a modified apparatus.

FIG. 3 shows that the sealing means including the strips 9 can be replaced by a simpler sealing device 109 which is an elastic cushion made of rubber or the like and is large enough to overlie the window 4 and to be deformed by the cheeks 5, 6 as well as to sealingly engage the outer sides of the sections 1A, 1B of a properly inserted cassette. The cushion 109 is preferably polygonal, i.e., its configuration matches or resembles that of the window 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

WE CLAIM:

1. Apparatus for winding photosensitive webs onto rotary takeup devices the web-receiving portions of which are installed in the interior of containers of the type wherein successive increments of the web advance past a light-admitting opening on their way toward the takeup device and the opening is located at a predetermined distance from the takeup device, comprising means for supporting a container not located in a picture-taking apparatus so that the web in the thus supported container can be advanced independently of the film transporting mechanism of such picture-taking apparatus, and in a predetermined position in which a portion of the thus supported container is exposed and accessible; a rotary driving element mounted in said supporting means; sealing means mounted in said supporting means at said predetermined distance from said driving element to prevent entry of light into the opening of a container which assumes said predetermined position and whose takeup device is placed into engagement with and is rotated by said driving element in a direction to advance the web toward and to convolute the web on the takeup device; and means for rotating said element upon engagement with a takeup device so as to continuously convolute the web on such takeup device until the convoluting operation is completed.

2. Apparatus as defined in claim 1 for winding webs onto takeup devices of the type having gear-shaped portions located outside of the respective containers, wherein said driving element is a gear adapted to mesh with the gear-shaped portion of a takeup device in a container whose opening is shielded from light by said sealing means.

3. Apparatus as defined in claim 1 for winding webs onto takeup devices in containers having polygonal light-admitting openings, wherein said sealing means comprises a polygonal cushion consisting at least in part of elastomeric material so as to be deformable by a container whose opening overlies and is sealed by said cushion.

4. Apparatus as defined in claim 1 for winding webs onto takeup devices in container having a predetermined shape, wherein said supporting means includes a socket having an outline which is complementary to said predetermined shape so that the opening of a container which is inserted into said socket is automatically shielded from light by said sealing means and the takeup device of such container is in torque-receiving engagement with said driving element.

5. Apparatus as defined in claim 1, wherein said sealing means comprises a plurality of deformable substantially strip-shaped sealing members.

6. Apparatus as defined in claim 1, wherein said supporting means includes a housing for said driving element, said housing having a wall defining a socket into which said driving element extends and which is arranged to receive a portion of a container whose opening is shielded from light by said sealing means and whose takeup device is in torque-receiving engagement with said element.

7. Apparatus as defined in claim 1, wherein said rotating means comprises an electric motor.

8. Apparatus as defined in claim 1, wherein said rotating means comprises a motor and a transmission interposed between said motor and said driving element.

9. Apparatus as defined in claim 1 for winding webs onto takeup devices in containers of the type wherein the trailing end of the web is secured to the container to withstand separation from the container with a predetermined force, wherein said rotating means includes motor means arranged to transmit to said driving element torque whose magnitude is less than said predetermined force so that the web prevents further rotation of said driving element when it is fully convoluted onto the respective takeup device save for said trailing end thereof.

10. Apparatus as defined in claim 1, wherein said driving element is a metallic gear.

11. Apparatus as defined in claim 1, wherein said rotating means comprises normally idle prime mover means for said driving element and means for starting said prime mover means in response to movement of a container to said predetermined position with respect to said supporting means in which the opening of such container is shielded against entry of light by said sealing means.

12. Apparatus as defined in claim 11, wherein said prime mover means comprises an electric motor and said starting means comprises a container-actuated switch connected in circuit with said motor.

13. Apparatus as defined in claim 12, wherein said supporting means includes a socket for portions of containers and said switch includes a movable portion extending into said socket.

14. Apparatus for winding webs onto rotary takeup devices the web-receiving portions of which are installed in the interior of containers of the type wherein successive increments of the web advance past a polygonal light-admitting opening on their way toward the takeup device and the opening is located at a predetermined distance from the takeup device and is flanked by two parallel cheeks disposed at a fixed distance from each other, comprising supporting means; a rotary driving element mounted in said supporting means; and sealing means mounted in said supporting means at said predetermined distance from said driving element to prevent entry of light into the opening of a container whose takeup device is placed into engagement with and is rotated by said driving element in a direction to advance the web toward and to convolute the web on the takeup device, said sealing means comprising a cushion consisting at least in part of elastomeric material so as to be deformable by a container whose opening overlies and is sealed by said cushion, the width of said cushion exceeding said fixed distance so that the cheeks of a container whose opening is shielded from light by said sealing means engage and deform said cushion.

15. Apparatus for winding webs onto rotary takeup devices the web-receiving portions of which are installed in the interior of containers of the type wherein successive increments of the web advance past a light-admitting opening on their way toward the takeup device and the opening is located at a predetermined distance from the takeup device and is flanked by cheeks of the container, comprising supporting means; a rotary driving element mounted in said supporting means; and sealing means mounted in said supporting means at said predetermined distance from said driving element to prevent entry of light into the opening of a container whose takeup device is placed into engagement with and is rotated by said driving element in a direction to advance the web toward and to convolute the web on the takeup device, said sealing means comprising a plurality of substantially strip-shaped elastic sealing members arranged to be deformed by the cheeks of a container whose takeup device is rotated by said driving element.

* * * * *